United States Patent Office 3,535,154
Patented Oct. 20, 1970

3,535,154
PROCESS FOR THE PRODUCTION OF A PORE TIGHT COATING ON SILICON NITRIDE MOLDED BODIES
Eugen Meyer-Simon, Frankfurt, Gerhard Kühner, Grossauheim, and Paul Meffert, Wolfgang, Germany, assignors to Deutsche Gold- und Silber-Scheideanstalt vormals Roessler, Frankfurt am Main, Germany
No Drawing. Filed Dec. 19, 1968, Ser. No. 785,373
Claims priority, application Germany, Dec. 20, 1967, 1,646,500
Int. Cl. C03c 25/02
U.S. Cl. 117—123
8 Claims

ABSTRACT OF THE DISCLOSURE

Pore tight coatings for silicon nitride molded bodies are prepared by dipping the molded bodies in an aqueous solution of an alkali metal, alkaline earth metal or heavy metal salt and then calcining in an oxygen containing gas at a temperature of 1200 to 1500° C.

---

A series of processes are known for the production of molded bodies from silicon nitride. The reaction sintering process is the most important of these processes. It starts with elementary silicon, which is brought into the desired shape and converted, at 1200 to 1500° C. in a nitrogen stream, to the nitride. A molded body produced in this manner is by nature porous, since the nitriding process can only be continued in the inside of the molded bodies if corresponding pores and channels remain open. Through appropriate measures during the molding (for example, variation of the pressing force) there can be produced molded bodies having a porosity of 18 to 28%.

Another method of production which is known starts with silicon nitride powder, which after forming and sintering in an inert gas also produces only porous molded bodies. Besides, these products have only an inferior mechanical strength. Finally, there are two processes which yield exceptionally pore-free bodies of high density—the hot press process and the pyrolitic process. Both processes are very complicated and excluded in the mass production of special molded parts. Moreover, because of their great hardness, the resulting parts can be worked only with diamond tools. As a rule, one will use the reaction sintering process for the production of silicon nitride and then must make an allowance for a certain porosity. There are, however, a series of possible uses where gas or vacuum tightness is important, or in which a smooth surface is desired. In such applications this material cannot be employed in unaltered form.

For silicon nitride which additionally contains 5–10% silicon carbide, it has been attempted to make the pores tight by applying an oxide film glaze. This is shown in a process described in DAS 1,240,458, wherein a composition containing silicon, aluminum and iron oxides is applied to the molded body and glazed on the surface at 1300 to 1500° C. within 3 to 4 hours in an oxygen atmosphere. A number of disadvantages results from the use of this composition for molded bodies from pure silicon nitride, which above all, are caused by the iron oxide which effects decomposition of silicon nitride at higher temperatures. Additionally, the good corrosion resistance of the silicon nitride is reduced. Furthermore, there is the fact that it is not possible to accomplish a uniform application of the oxide mixture on inaccessible places necessary to obtain a uniform coat on a complexly shaped part.

Accordingly, it is an object of the present invention to develop an appropriate, easily applied coating for porous silicon nitride which, in its chemical and thermal properties, is not too far removed from the properties of silicon nitride.

Another object is that the coating should be producible in the desired thickness and should use the least possible foreign materials in its production in order not to injure the desirable properties of silicon nitride (stability to changes in temperature, corrosion resistance, etc.).

These and other objects of the invention are accomplished in the manner set forth below.

By experiments in which the oxidation resistance of silicon nitride was considered, it was found that by heating silicon nitride in air to a temperature of 1500 to 1600° C. for a short time, e.g. 30 to 60 minutes, a glazed surface film was formed which consisted at least in part of silicon dioxide. The production of such a film on the one hand requires high temperatures and on the other hand, is not reproducible and able to be manufactured in the desired film thickness since impurities incidentally present lower the melting point of the glass formed and thereby influence the formation of the film.

It has now been found that by addition of specific materials in proper amounts such a lowering of the melting point can be brought about to a desired and controlled extent, whereby there can also be varied both the film thickness and the penetration depth and locking of the film to the base material. As materials which are suitable for forming the film there can be used compounds of alkali and alkaline earth metals, as well as of heavy metals such as lead.

They are added in the form of their salts. The anion is not critical and can be chosen at pleasure. Thus there can be used barium chloride, barium bromide, barium nitrate, calcium chloride, calcium bromide, calcium iodide, calcium nitrate, sodium chloride, sodium silicate, sodium bromide, sodium fluoride, sodium iodide, sodium sulfate, sodium nitrate, sodium phosphate, potassium chloride, potassium silicate, potassium nitrate, potassium iodide, potassium sulfate, lead nitrate. Moreover, chlorides, bromides, nitrates, iodides, silicates, fluorides, sulfates and phosphates of lithium, rubidium, caesium, strontium and magnesium as well as salts of organic acids like calcium oxalate and sodium tartrate can be used. Mixtures of salts, of course, can be employed. For this purpose, an aqueous solution of the salt used is prepared and the silicon molded body which is to be coated is dipped therein. A special coating technique is not needed in order that the silicon nitride porosity will take up the solution.

According to the invention the following separate steps are taken. First there is produced an aqueous solution of the salt used. The concentration of the salt has a controlling influence on the thickness of the film formed. In general, the more concentrated the solution, the thicker the film. Hollow bodies can be infused with the solution for a short time whereby the subsequent film building results in the inside of the body. Due to their porosity, the bodies are impregnated with the solution. The extent of impregnation (or depth of penetration) is influenced by the adjustment of the time of immersion. If only a very small penetration depth is desired then, with the help of organic binders which act as fillers, e.g. a 5% aqueous solution of Tylose, it can be arranged that the pores present are quickly clogged, so that the impregnation is limited to a thin surface film. Other organic binders which can be employed include starch, tragacanth and alginates.

The so-treated objects are then heated in air or other oxygen containing gas (e.g. pure oxygen or oxygen containing inert gases like the noble gases, nitrogen, carbon dioxide) to a temperature of 1200 to 1500° C. and kept there for 15–300 minutes, preferably 30 to 120 minutes. The heating and cooling can take place very quickly. The temperature at which the film formation takes place depends on the specific cation of the salt employed. In using sodium salts, the desired film is formed initially above 1250° C., preferably, however, temperatures above 1350° C. are used. For the production of the film there are the following possible variables.

(1) Adjustment of the film thickness to values between 1 μm to 0.5 mm.

Primarily through adjustment of the concentration in a wide range from 0.1% up to values where saturation of the solution is complete, preferably between 5 and 15% also influenced in a certain range by the duration of the steeping. Immersion times are between 1 second and the time necessary for saturation of the body, preferably between 5–40 seconds. With bodies having high density, e.g. 2.5 gm./cm.$^3$, the time necessary for its saturation can extend to 12 hours and more.

(2) Penetration depth (anchoring) of the film.

Primarily through the duration of the steeping; to obtain less depth of penetration through the use of organic additives.

(3) Manner of coating, temperature or corrosion stability.

Achieved through choice of cations.

The salts added to the silicon nitride for the most part are decomposed with the anions as a rule being volatilized (except when silicates are used). The cation first of all facilitates the oxidation of the silicon nitride, so that in part, the oxide bound silicon comes to the surface. It can be demonstrated that an intermediate layer of silicon oxide nitride or alkali nitride silicate is formed in the transition area which is fastened to the glass film on the surface. The intermediate layer has a thickness of several hundredths of a millimeter and still contains nitrogen. As a result, the properties of silicon nitride are not removed to too great an extent and the joining of the film and substrate is excellent. It is made evident therefrom that after formation of a coating the excellent resistance to change in temperature of the silicon nitride is preserved.

Unless otherwise indicated, all parts and percentages are by weight.

EXAMPLE 1

According to the invention a molded body of silicon nitride having a density of 2.3 gm./cm.$^3$ was dipped in a 5% aqueous solution of sodium chloride and after steeping for 10 seconds was removed from the solution. After the drying of the body, it was heated at a temperature of 1340° C. for 90 minutes whereby a uniform 0.05 mm. thick coating formed which had a good resistance to changes in temperature.

EXAMPLE 2

A thermo protecting tube of 5 mm. inner diameter made of silicon nitride was to be provided with an inner coating. For that purpose, it was filled for 15 seconds with a 5% aqueous sodium nitrate solution and after drying heated to 1350° C. for about 75 minutes. The coating built up on the inner surface was gas and vacuum tight.

EXAMPLE 3

A tube of silicon nitride having a density of 2.1 gm./cm.$^3$ was dipped in an 8% aqueous solution of magnesium chloride and after drying, heated to 1500° C. for about 60 minutes whereby a uniform coating having a thickness of 0.06 mm. was obtained.

EXAMPLE 4

A molded body of silicon nitride having a density of 2.3 gm./cm.$^3$ was dipped in a 15% aqueous solution of sodium chloride and after steeping for 10 seconds was removed from the solution. After the drying of the body, it was heated at a temperature of 1340° C. for 90 minutes whereby a uniform 0.2 mm. thick coating formed which had a good resistance to changes in temperature.

EXAMPLE 5

A molded body of silicon nitride having a density of 2.3 gm./cm.$^3$ was dipped in a 5% aqueous solution of sodium chloride and after steeping for 40 seconds was removed from the solution. After the drying of the body, it was heated at a temperature of 1340° C. for 90 minutes whereby a uniform 0.1 mm. thick coating formed which had a good resistance to changes in temperature, the anchoring zone of the coating extending 1 mm. into the silicon nitride body.

EXAMPLE 6

A molded body of silicon nitride having a density of 2.3 gm./cm.$^3$ was first dipped in a 5% aqueous solution of Tylose for 15 seconds and then dipped in a 5% aqueous solution of sodium chloride and after steeping for 10 seconds was removed from the solution. After the drying of the body, it was heated at a temperature of 1340° C. for 90 minutes whereby a uniform 0.02 mm. thick coating formed which had a good resistance to changes in temperature.

EXAMPLE 7

A molded body of silicon nitride having a density of 2.3 gm./cm.$^3$ was dipped in a 4% aqueous solution of sodium alginate and after steeping for 20 seconds was removed from the solution. After the drying of the body, it was heated at a temperature of 1340° C. for 90 minutes whereby a uniform 0.02 mm. thick coating formed which had a good resistance to changes in temperature.

What is claimed is:

1. In a process for the preparation of a pore tight coating on a silicon nitride molded body, the improvement comprising impregnating the molded body with an aqueous solution of a salt selected from the group consisting of alkali metal, alkaline earth metal and lead salts and then calcining the thus impregnated body in an oxygen containing gas at a temperature between 1200 and 1500° C.

2. A process according to claim 1 wherein the salt is a sodium salt.

3. A process according to claim 1 wherein the salt is an alkaline earth metal salt.

4. A process according to claim 1 wherein the salt is a lead salt.

5. A process according to claim 1 wherein the salt is an alkali metal salt and the calcining temperature is about 1350° C.

6. A process according to claim 1 wherein the calcining is carried out for 15–300 minutes.

7. A process according to claim 6 wherein the salt is an alkali metal or alkaline earth metal salt, the impregnation is carried out for a time between 1 second and the time necessary for saturation of the body and the aqueous solution has a concentration between 0.1% and its saturation concentration.

8. A process according to claim 6 wherein the calcining is carried out for 30 to 120 minutes.

References Cited

UNITED STATES PATENTS 3,394,026 7/1968 Parr et al. _____ 117—169 X
3,455,729 7/1969 Deeley et al. _____ 117—106

FOREIGN PATENTS 1,117,788 11/1965 Great Britain.

ALFRED L. LEAVITT, Primary Examiner

D. A. SIMMONS, Assistant Examiner

U.S. Cl. X.R.

23—191; 117—118, 169; 264—62